(12) United States Patent
Schmit et al.

(10) Patent No.: US 11,314,154 B2
(45) Date of Patent: Apr. 26, 2022

(54) DUCTED COOLING SYSTEM OF A CAMERA

(71) Applicant: GRASS VALLEY CANADA, Montreal (CA)

(72) Inventors: Erwin Schmit, Delft (NL); Peter Vissers, Prinsenbeek (NL); Menno de Waal, Oosterhout (NL)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 17/223,683

(22) Filed: Apr. 6, 2021

(65) Prior Publication Data

US 2021/0318594 A1    Oct. 14, 2021

Related U.S. Application Data

(60) Provisional application No. 63/008,044, filed on Apr. 10, 2020.

(51) Int. Cl.
*G03B 17/55* (2021.01)
*G03B 17/12* (2021.01)
*H04N 21/2187* (2011.01)

(52) U.S. Cl.
CPC ............ *G03B 17/55* (2013.01); *G03B 17/12* (2013.01); *H04N 21/2187* (2013.01)

(58) Field of Classification Search
CPC ................................ G03B 17/55; G03B 17/12
See application file for complete search history.

(56) References Cited

U.S. PATENT DOCUMENTS

| 9,838,558 B2 | 12/2017 | Petty et al. |
| 10,412,252 B2 | 9/2019 | Petty et al. |
| 10,855,870 B2 | 12/2020 | Petty et al. |

(Continued)

FOREIGN PATENT DOCUMENTS

| EP | 3079345 A1 | 10/2016 |
| JP | H04331580 A | 11/1992 |

(Continued)

OTHER PUBLICATIONS

Extended European Search Report issued for 21167678.8-1208, dated Aug. 2, 2021.

*Primary Examiner* — Clayton E. LaBalle
*Assistant Examiner* — Diana Hancock
(74) *Attorney, Agent, or Firm* — Arentfox Schiff LLP

(57) ABSTRACT

A broadcast camera is provided that includes a camera housing having connectable camera housing portions to define a front, middle and rear sections of a camera body. An electronic component is provided in the front section of the camera housing and a power transformer is mounted in the rear section of the camera housing. A duct housing is mounted within the camera housing to form a cooling duct that extends through the camera housing, with a front duct housing that is positioned adjacent to the electronic component and that separates the electronic component from the cooling duct. Moreover, heat sinks extend within the cooling duct in one of the upper, middle and lower front duct sections and are mounted to be in thermal communication with the at least one electronic component. A fan is mounted within the cooling duct to draw air into the cooling duct.

20 Claims, 3 Drawing Sheets

(56) References Cited

U.S. PATENT DOCUMENTS

| | | |
|---|---|---|
| 2016/0301819 A1 | 10/2016 | Petty et al. |
| 2017/0214830 A1* | 7/2017 | Tang .................... H04N 5/2257 |
| 2018/0054542 A1 | 2/2018 | Petty et al. |
| 2019/0174030 A1* | 6/2019 | Kojima .............. H04N 5/22521 |
| 2019/0285970 A1 | 9/2019 | Mano et al. |
| 2020/0036852 A1 | 1/2020 | Petty et al. |
| 2021/0055631 A1* | 2/2021 | Mano ................... H04N 5/2252 |
| 2021/0160411 A1* | 5/2021 | Yamagata .......... H04N 5/22521 |
| 2021/0231910 A1* | 7/2021 | Mano ................... H04N 5/2254 |

FOREIGN PATENT DOCUMENTS

| | | |
|---|---|---|
| JP | 2015026876 A | 2/2015 |
| JP | 2015220583 A | 12/2015 |

* cited by examiner

DUCTED COOLING SYSTEM OF A CAMERA

CROSS REFERENCE TO RELATED APPLICATIONS

The present application claims priority to U.S. Patent Provisional Application No. 63/008,044, filed Apr. 10, 2020, the entire contents of which are hereby incorporated by reference in its entirety.

TECHNICAL FIELD

The present disclosure generally relates to an apparatus for cooling internal elements of a camera, and, more particularly, to a ducted cooling system for a broadcast camera.

BACKGROUND

Fan cooling has commonly been a preferred method of cooling heat generating components within a broadcast camera because the thermal energy dissipated by these components is too high to be transferred through passive cooling. Despite being the preferred method, there are a number of issues that fan cooling presents. The use of fan cooling moves dust through the camera, and the holes required to move air through the camera allow water and electromagnetic radiation to enter the camera that may affect the operating of the heat generating components, which are typically electrical devices sensitive to dust and moisture.

The general method of preventing the issues that fan cooling presents is to install filters at the air inlets and outlets on the camera. While filters can help prevent unwanted substances from entering the camera, they also impede the airflow, which causes the cooling to become less efficient and additionally causes the fan to make more noise. Further, after long periods of time these filters can become filled with dust and dirt requiring that they be replaced. These issues with fan cooling call for a more advantageous and efficient method of cooling a broadcast camera.

SUMMARY

A broadcast camera is provided that includes a cooling system having a duct with a fan and heatsinks situated therein so that they are separated from an area where electronics of the camera are situated. The duct runs through a middle of the camera from a front to a back of the camera. As such, heat from the electronics is transferred through the heatsinks that are mounted (e.g., spring mounted) inside the duct. This configuration makes the air run through the heatsinks only, for example, within the duct, and not through the electronics. Apart from protecting the electronics from water, dust and electromagnetic interference (EMI), this configuration also makes the cooling very efficient compared with conventional designs.

In an implementation, for example, the broadcast camera comprises a camera housing having a plurality of connectable camera housing portions to define a front section, a middle section, and a rear section. A color splitter is mounted in the front section of the camera housing. A plurality of image sensors are positioned adjacent to the color splitter. A main processor board is mounted in the first housing portion at the middle section of the camera housing. A transmission circuit board is mounted in the second housing portion at the middle section of the camera housing. A power transformer is mounted in the camera housing at the rear section. A duct housing is mounted in the camera housing and has a first duct housing section sealably connected to a second duct housing section to define a front duct housing portion, a middle duct housing portion, and a rear duct housing portion that form a cooling duct that extends through the camera housing.

The front duct housing portion is positioned adjacent to the color splitter and the plurality of image sensors and separates the color splitter and the plurality of image sensors from the cooling duct. The front duct housing portion includes an upper front duct section positioned adjacent to a top of the color splitter and the plurality of image sensors and extends toward a front of the broadcast camera. The upper front duct section includes an inner top front duct section wall that defines a top front air inlet to the cooling duct. The front duct housing portion further includes a middle front duct section positioned adjacent to a back of the color splitter and the plurality of image sensors, wherein the middle front duct section includes an inner middle front duct section wall that defines a middle front air inlet to the cooling duct. Lastly, the front duct housing portion includes a lower front duct section positioned adjacent to a bottom of the color splitter and the plurality of image sensors and extending toward the front of the camera, wherein the lower front front duct section includes an inner bottom front duct section wall that defines a bottom front air inlet to the cooling duct.

Within the front duct housing portion, a first cover plate is positioned adjacent to the bottom front air inlet configured to seal a portion of the bottom front air inlet. A first heat sink extends within the cooling duct in the upper front duct section and is mounted in thermal communication with at least one of the color splitter and the plurality of image sensors. A second heat sink extends within the cooling duct in the middle front duct section and mounted in thermal communication with at least one of the color splitter and the plurality of image sensors. A third heat sink extends within the cooling duct in the lower front duct section and is mounted in thermal communication with at least one of the color splitter and the plurality of image sensors.

The middle duct housing portion is positioned adjacent to the main processor board and the transmission circuit board, and separates the main processor board and the transmission circuit board from the cooling duct. The middle duct housing portion includes a front middle duct section positioned adjacent to the front duct housing portion; an intermediate middle duct section adjacent to the main processor board and the transmission circuit board; and a rear middle duct section positioned adjacent to the rear duct housing portion. Moreover, a fan is mounted within the cooling duct at the front middle duct section and is configured to draw air into the cooling duct through the top front air inlet, the middle front air inlet, and the bottom front air inlet. A fourth heat sink extends within the cooling duct in the intermediate middle duct section and is mounted in thermal communication with the main processor board. A fifth heat sink extends within the cooling duct in the intermediate middle duct section and mounted in thermal communication with the transmission circuit board. A second cover plate is mounted between the fifth heat sink and the transmission circuit board and is configured to form at least a part of a side wall of the middle duct housing portion.

The rear duct housing portion is positioned adjacent to the power transformer, and includes a first inner rear duct wall adjacent to the first camera housing portion that defines a side rear duct housing opening sized to receive at least a part of the power transformer within the cooling duct. The rear duct housing portion further includes a second inner rear duct wall adjacent to the second camera housing portion that defines a rear side air outlet of the cooling duct and a rear perforated plate connected to and sized to cover the rear side air outlet.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

Figure 1:
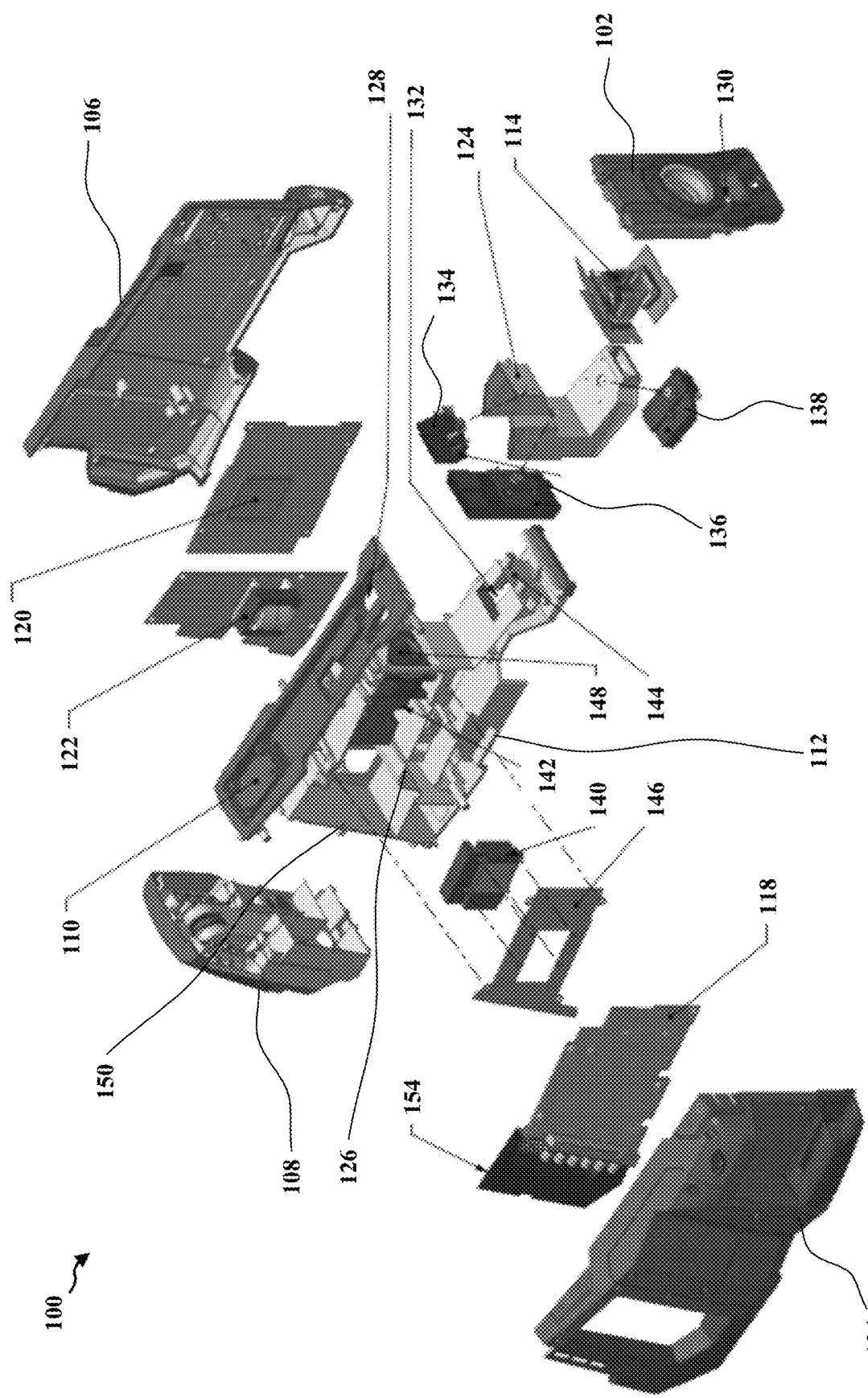
FIG. 1 is an exploded view of a broadcast camera, including a ducted cooling system for cooling heat dissipating components.

Various aspects of the disclosure are now described with reference to the drawings, wherein like reference numerals are used to refer to elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. The following presents a simplified summary, based on FIGS. 1 through 3, of one or more aspects of the disclosure in order to provide a basic understanding thereof.

A ducted cooling system for a camera (e.g., a broadcast camera) is provided according to an exemplary embodiment of the present disclosure. The embodiment is provided for a broadcast camera, but it is noted that the exemplary aspects can be implemented on other types of cameras as would be appreciated to one skilled in the art. The ducted cooling system includes a cooling duct that is sealed from the other components of the camera to prevent dust, water ingress, and electromagnetic interference from affecting the heat generating components of the camera, which typically include sensitive electronics. In exemplary aspects, the ducted cooling system includes a plurality of air inlets at a front of the camera configured to allow air into the ducted cooling system and into a front duct housing portion. Additionally, the front section of the cooling duct houses three heat sinks that are mounted in thermal communication with a color splitter and image sensors so as to dissipate the heat generated by these components.

The ducted cooling system is configured such that air flows through the front duct housing portion and into a middle duct housing portion. Located in the middle duct housing portion are a fan configured to draw air through the cooling duct, and a fourth heat sink and a fifth heat sink to dissipate heat from additional camera components. In an exemplary aspect, the fan is located between the first, second, and third heat sinks and the fourth and fifth heat sinks. The fan generates the flow of air through each of the portions of the cooling duct and across the heat sinks extending within the cooling duct. The fourth and fifth heat sinks are mounted within the cooling duct in thermal communication with a main processor board and a transmission circuit board, respectively, so as to dissipate the heat generated by these components. It is generally noted that while the exemplary embodiment includes five heat sinks, one or more of these heat sinks can be removed according to variations in configurations. Alternatively, additional heat sinks can be added to the camera design in additional exemplary aspects.

In either case, the ducted cooling system also includes a rear duct housing portion through which the air flows and exits the cooling duct. The rear duct housing portion includes an internal wall that defines an opening to expose a power transformer to the air flowing through the cooling duct. For example, the power transformer protrudes into the back of the cooling duct through the opening in one of the side walls. This allows the heat generated by the power transformer to dissipate into the cooling duct. Finally on the other wall in of the rear duct housing portion is a large side rear outlet, where the heat and air will exit the cooling duct. This outlet is covered by a perforated plate to help prevent outside substances from entering the cooling duct.

Thus, present disclosure of a ducted cooling system for a broadcast camera can include one or more of the following features: the air flow and the electronics are separated from each other by a duct; EMI protection, for example, based on the duct, and camera housing, being made from metal (e.g., magnesium); the heatsinks for dissipating heat from the main power dissipating components (e.g., three image sensors and two image processors) are configured with a specific orientation to provide an uninterrupted air flow through the duct; the duct may be may up of multiple parts, e.g., two part, to accommodate different orientations of the heatsinks, for example, one is part of the camera base and cools the image processors and the other is part of the front module and cools the image sensors; and a parting line between these two parts of the duct may be lined with a conductive rubber gasket to prevent water ingress and EMI.

Figure 2:
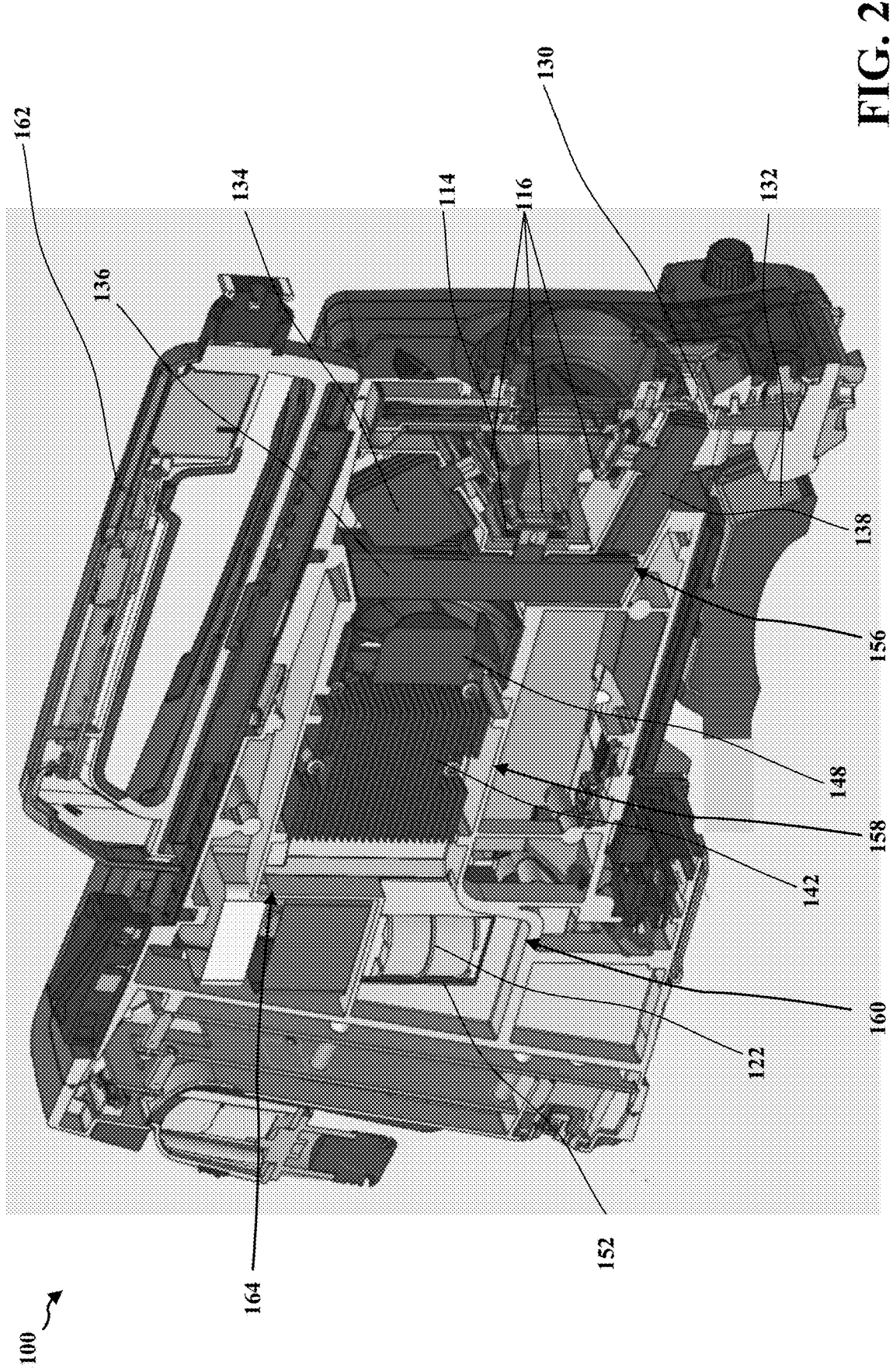
FIG. 2 is a cross-sectional view of the broadcast camera of FIG. 1.
Figure 3:
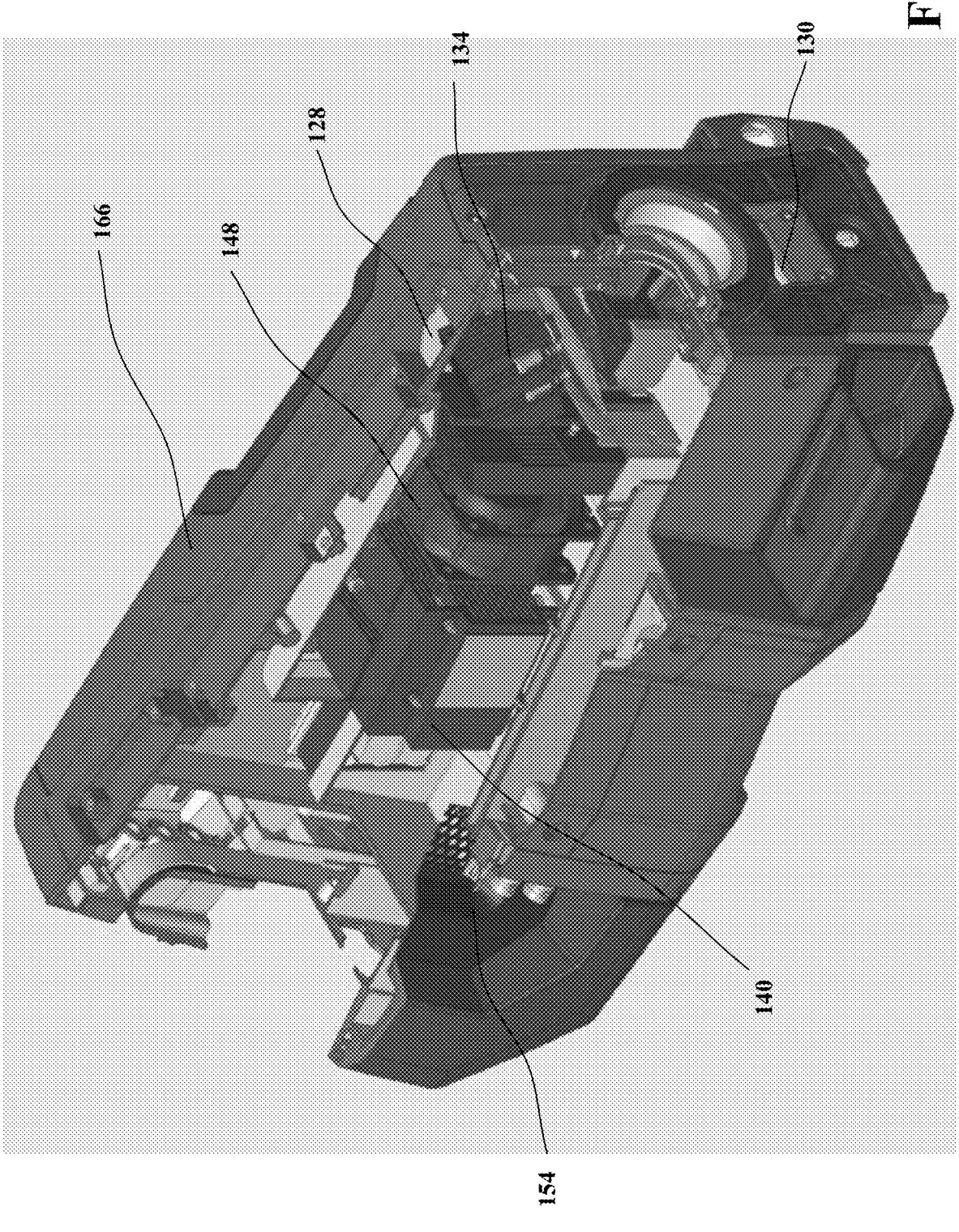
FIG. 3 is a partial cross-sectional view of the broadcast camera of FIG. 1.

Referring to FIGS. 1 through 3, in an example implementation, a broadcast camera 162 includes a ducted cooling system 100 having a cooling duct 164 extending through a body of the broadcast camera 162 and configured to separate cooling components with the cooling duct 164 from heat generating components mounted within the broadcast camera 162. In an exemplary aspect, the ducted cooling system 100 has a number of cooling components, such as heat sinks and a fan, that are configured to dissipate heat generated by a number of heat generating components, such as electronics, of the broadcast camera 162. The ducted cooling system 100 may be contained or defined within a camera housing 166 of the broadcast camera 162, where the camera housing 166 may be formed from a plurality of camera housing portions. In this example implementation, for instance, the broadcast camera 162 can be considered to include five camera housing portions or members. The first camera housing portion 102 defines the front of the broadcast camera 162 the second camera housing portion 104 and third camera housing portion 106 define the sides (e.g. lateral or left and right sides) of the camera, the fourth camera housing portion 108 defines the back of the camera, and the fifth camera housing portion 110 defines the top of the camera. The bottom portion of the camera 112 may be defined by the bottom of the cooling duct 100 along with a number of other camera components. The camera housing portions are connected to define a front, middle, and rear section of the camera housing.

According to the exemplary aspect, the heat generating components of the camera are located within the camera housing 166, but outside of the cooling duct 164. For example, the broadcast camera 162 may include a color splitter 114 and one or more image sensors 116 mounted in the front section of the camera housing. Further, the broadcast camera 162 may include a transmission circuit board 118 and a main processor board 120 mounted in the middle section of the camera housing. In the example implementation, the transmission circuit board 118 is located on the side of the cooling duct 164 adjacent to the second camera housing portion 104 and the main processor board 120 is located on the opposite side of the cooling duct 164 adjacent to the third camera housing portion 106. Additionally, the broadcast camera 162 may include a power transformer 122 mounted in the rear section of the camera housing. It is noted that these heat generating components of the camera (i.e., the electronic components) can be located at alternative positions within the camera housing 166 as long as they are outside of the cooling duct 164.

As shown, the cooling duct 164 runs from front to rear within the camera housing and is positioned adjacent to the heat generating components discussed above to allow cooling components to extend within the cooling duct 164 while being connected to the heat generating components through the wall of the cooling duct 164. In an exemplary aspect, the cooling duct 164 can be made from a material such as magnesium that prevents the passage of electromagnetic radiation, and hence provides electromagnetic interference (EMI) protection for the heat generating components. The cooling duct 164 is comprised of a first duct housing section 124 and a second duct housing section 126, which are connected, and wherein the connection can be sealed by a conductive rubber gasket in order to prevent water ingress and electromagnetic radiation. The first duct housing section 124 and the second duct housing section 126 connect to form the cooling duct 164, and define a front duct housing portion 156, a middle duct housing portion 158, and a rear duct housing portion 160. Contained within these duct housing portions are cooling components constructed to dissipate the heat generated by the heat generating components. In this example implementation, for instance, the cooling components include a fan 148 that is configured to generate air flow through the cooling duct 164 and past a plurality of heat sinks 134, 136, 138, 140, 142 that each extend within the cooling duct 164 and are each connected or coupled to a corresponding heat generating component to dissipate heat.

In an exemplary aspect, each of heat sinks 134, 136, 138, 140, and 142 can be formed, for example, of a thermally conductive material, such as aluminum, and may include a heat sink body and a plurality of fins extending from the heat sink body to increase a surface area of the heat sink to improve heat dissipation. In an exemplary aspect, the plurality of fins of each of the heat sinks 134, 136, 138, 140, 142 extend in a plane that is parallel or substantially parallel with a direction of airflow through the cooling duct 164 so as to provide efficient airflow through the cooling duct 164. As air flows past the plurality of heat sinks 134, 136, 138, 140, 142, the air flow is configured to dissipate heat transmitted to the heats sinks from the heat generating components coupled thereto as is known to those skilled in the art.

As further shown, the front duct housing portion 156 is located adjacent to the color splitter 114 and the image sensors 116 on three sides, and separates these components from the cooling duct 164. In this example implementation, the front duct housing portion 156 has a C-shape and can be further broken up into upper, middle and lower front duct housing portions.

The upper front duct housing portion is positioned adjacent to the top of the color splitter 114 and the image sensors 116, and extends toward the front of the camera. The first heat sink 134 is mounted and sealed to the upper front duct housing portion and is in thermal communication with the color splitter 114 and image sensors 116, such that it is configured to dissipate at least a portion of the heat generated by these components. The fifth camera housing portion 110 seals the upper front duct housing portion and forms the first air inlet 128 (e.g., a top front air inlet). The first air inlet 128 is positioned to allow air to enter the cooling duct 100 and pass through the first heat sink 134 based on operation of the fan 148.

The middle front duct housing portion is positioned adjacent to the side of the color splitter 114 and image sensors 116. The second heat sink 136 is mounted and sealed to the middle front duct housing portion and is in thermal communication with the color splitter 114 and image sensors 116. The second heat sink 136 extends upward into the upper front duct housing portion, such that a portion of the second heat sink 136 is adjacent to a portion of the first heat sink 134, and downward into the lower front duct housing portion.

As further shown, the lower front duct housing portion is positioned adjacent to the bottom of the color splitter 114 and image sensors 116, and extends towards the front of the broadcast camera 162. The third heat sink 138 is mounted and sealed to the lower front duct housing portion and is in thermal communication with the color splitter 114 and image sensors 116. The second air inlet 130 (e.g., a middle front air inlet) is formed in the lower front duct housing portion at the front of the broadcast camera 162 below the color splitter 114 and image sensors 116. Further, a third air inlet 132 (e.g., a bottom front air inlet) is formed in the lower front duct housing portion at the bottom portion of the camera 112. Each air inlet can generally be considered a port or opening allowing air to flow into and out of the camera.

As shown, the first cover plate 144 seals the third air inlet 132 in order to restrict outside elements from entering the cooling duct. The second and third air inlets 130, 132 are positioned to allow air into the cooling duct 164 and to pass through the third heat sink 138. Based on operation of the fan 148, the air flows through the first and third heat sinks 134, 138 and through the second heat sink 136. The air then flows through the third heat sink 136 and into the middle duct housing 158.

In an exemplary aspect, the middle duct housing 158 comprises a respective front middle duct housing section, an intermediate middle duct housing section, and a rear middle duct housing section. The middle duct housing 158 is adjacent to the transmission circuit board 118 and the main processor board 120, and separates these components from the cooling duct 164.

The front middle duct housing section is located adjacent to the front duct housing 156. The fan 148 is mounted in the front middle duct housing section adjacent to the third heat sink 138. The fan 148 is configured to draw air into the cooling duct 164 through the first air inlet 128, second air inlet 130, and third air inlet 132, move the air through the cooling duct 164 toward the back of the broadcast camera 162, and push or otherwise blow the air out of the cooling duct 164 through the air outlet 150. Thus, according to the exemplary embodiment and as will be discussed in more detail below, one or more fans (e.g., fan 148) are configured to pull air in through air inlets 128, 130 and 132, to pass through a plurality of heat sinks, before the air is exhausted from air outlet 150. As a result, heat that is transferred from the heat generating components to the plurality of heat sinks can be dissipated from air outlet 150 using the exemplary ducted cooling system 100. It should be appreciated that the air flow can be in an opposite direction in an alternative aspect.

The intermediate middle duct housing section is located adjacent to the transmission circuit board 118 on one side and adjacent to the main processor board 120 on the opposite side. The fourth heat sink 140 is mounted and sealed to the side of the intermediate middle duct housing section adjacent to and in thermal communication with the transmission circuit board 118. The fifth heat sink 142 is mounted on the opposite side of the intermediate middle duct housing section adjacent to and in thermal communication with the main processor board 120. The connection between the fifth heat sink 142 and the main processor board 120 is sealed by the second cover plate 146. Based on operation of the fan 148, the air flows through the fourth and fifth heat sinks 140, 142 and rear middle duct housing, and into the rear duct housing portion 160. As a result, generated heat that is transmitted to the fourth and fifth heat sinks 140, 142 can also be dissipated by the air flow generated by fan 148.

As further shown, the rear duct housing portion 160 has an opening 152 to allow the power transformer 122 to partially protrude into the cooling duct 164. This allows the heat generated by the power transformer 122 to dissipate into the cooling duct 164, and quickly exit the cooling duct 164 through the air outlet 150 on the opposite side of the rear duct housing. In an implementation, an area of the air outlet 150 may be the same as or larger than a sum of the areas of the air inlets 128, 130, 132 to allow for efficient airflow. In another exemplary implementation, the air outlet is covered by a perforated plate 154 to restrict outside elements from entering the cooling duct 164 while allowing the air to exit the cooling duct 164.

According to the example implementation, in operation, the fan 148 is configured to draw cool air, relative to the heat generating components, into the cooling duct 164 through the first air inlet 128, second air inlet 130, and third air inlet 132. The air then flows through the first heat sink 134, second heat sink 136, and third heat sink 138, which are all mounted to and in thermal communication with the color splitter 114, and image sensors 116. The heat from the color splitter 114 and image sensors 116 is transferred to the fins of these heat sinks 134, 436, 138 and dissipated by the air flowing through the heat sinks 134, 436, 138. The air then flows through the fan 148, and is pushed through the fourth heat sink 140 that is in thermal communication with the transmission circuit board 118 and the fifth heat sink 142 that is in thermal communication with the main processor board 120. The air then flows out of the fourth heat sink 140 and fifth heat sink 142 and into the chamber of the cooling duct 164 that contains the power transformer 122, which protrudes partially into the cooling duct 164. The air flows over the power transformer 122 dissipating the heat generated by the power transformer 122. The air (including the transferred heat from the electronic components) then flows out of the cooling duct 164 and is expelled through the air outlet 150. Thus, the broadcast camera 162 including the ducted cooling system 100 as described herein may provide improved heat dissipation from heat generating components within the broadcast camera 162 based on the configuration of the cooling duct 164 and heat sinks extending therein, while separating the heat generating components from the ducted cooling system 100 in order to avoid dust, dirt, moisture, or other foreign elements from interfering with the operation of the heat generating components.

In the interest of clarity, it is noted that not all of the routine features of the aspects are disclosed herein. It would be appreciated that in the development of any actual implementation of the present disclosure, numerous implementation-specific decisions must be made in order to achieve the developer's specific goals, and these specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A broadcast camera, comprising:
    a camera housing having a plurality of connectable camera housing portions to define a front section, a middle section, and a rear section of a body of the broadcast camera;
    a color splitter mounted in the front section of the camera housing;
    a plurality of image sensor positioned adjacent to the color splitter;
    a main processor board mounted in a first housing portion at the middle section of the camera housing;
    a transmission circuit board mounted in a second housing portion at the middle section of the camera housing;
    a power transformer mounted in the rear section of the camera housing;
    a duct housing mounted within the camera housing and having a first duct housing section sealably connected to a second duct housing section to define a front duct housing portion, a middle duct housing portion, and a rear duct housing portion that collectively form a cooling duct extending through the camera housing;
    wherein the front duct housing portion is positioned adjacent to the color splitter and the plurality of image sensors and separates the color splitter and the plurality of image sensors from the cooling duct, wherein the front duct housing portion includes:
        an upper front duct section positioned adjacent to a top of the color splitter and the plurality of image sensors and extending toward a front of the broadcast camera, wherein the upper front duct section includes an inner top front duct section wall that defines a top front air inlet to the cooling duct;
        a middle front duct section positioned adjacent to a side of the color splitter and the plurality of image sensors, wherein the middle front duct section includes an inner middle front duct section wall that defines a middle front air inlet to the cooling duct; and
a lower front duct section positioned adjacent to a bottom of the color splitter and the plurality of image sensors and extending toward the front of the camera, wherein the lower front duct section includes an inner bottom front duct section wall that defines a bottom front air inlet to the cooling duct;
a first cover plate positioned adjacent to the bottom front air inlet configured to seal a portion of the bottom front air inlet;
a first heat sink extending within the cooling duct in the upper front duct section and mounted in thermal communication with at least one of the color splitter and the plurality of image sensors;
a second heat sink extending within the cooling duct in the middle front duct section and mounted in thermal communication with at least one of the color splitter and the plurality of image sensors;
a third heat sink extending within the cooling duct in the lower front duct section and mounted in thermal communication with at least one of the color splitter and the plurality of image sensors;
wherein the middle duct housing portion is positioned adjacent to the main processor board and the transmission circuit board, and separates the main processor board and the transmission circuit board from the cooling duct, and wherein the middle duct housing portion includes:
a front middle duct section positioned adjacent to the front duct housing portion;
an intermediate middle duct section adjacent to the main processor board and the transmission circuit board;
a rear middle duct section positioned adjacent to the rear duct housing portion;
a fan mounted within the cooling duct at the front middle duct section and configured to draw air into the cooling duct through the top front air inlet, the middle front air inlet, and the bottom front air inlet;
a fourth heat sink extending within the cooling duct in the intermediate middle duct section and mounted in thermal communication with the main processor board;
a fifth heat sink extending within the cooling duct in the intermediate middle duct section and mounted in thermal communication with the transmission circuit board; and
a second cover plate mounted between the fifth heat sink and the transmission circuit board and configured to form at least a part of a side wall of the middle duct housing portion;
wherein the rear duct housing portion is positioned adjacent to the power transformer and includes:
a first inner rear duct wall adjacent to the first camera housing portion that defines a side rear duct housing opening constructed to receive at least a part of the power transformer within the cooling duct; and
a second inner rear duct wall adjacent to the second camera housing portion that defines a rear side air outlet of the cooling duct; and
a rear perforated plate constructed to cover the rear side air outlet.

2. The broadcast camera according to claim 1, wherein each of the first, second, third, fourth and fifth heats comprises a plurality of fins extending from a body of the respective heat sink and constructed for heat dissipation.

3. The broadcast camera according to claim 2, wherein the plurality of fins of each respective heat sink extend in a direction parallel to a direction of airflow of the air drawn into the cooling duct by the fan.

4. The broadcast camera according to claim 1, wherein the power transformer at least partially protrudes into the cooling duct from the side rear duct housing to dissipate heat generated by the power transformer into the cooling duct.

5. The broadcast camera according to claim 1, wherein the rear side air outlet comprises a total area that is at least as large as a sum of total areas of the top front air inlet, the middle front air inlet, and the bottom front air inlet.

6. A broadcast camera, comprising:
a camera housing having a plurality of connectable camera housing portions to define a front section, a middle section, and a rear section of a body of the broadcast camera;
at least one electronic component disposed in the front section of the camera housing and that generates heat during operation of the camera;
a main processor board mounted in a first housing portion at the middle section of the camera housing;
a transmission circuit board mounted in a second housing portion at the middle section of the camera housing;
a power transformer mounted in the rear section of the camera housing;
a duct housing mounted within the camera housing and having a first duct housing section sealably connected to a second duct housing section to define a front duct housing portion, a middle duct housing portion, and a rear duct housing portion that collectively form a cooling duct extending through the camera housing;
wherein the front duct housing portion is positioned adjacent to the at least one electronic component and that separates the at least one electronic component from the cooling duct, wherein the front duct housing portion includes:
an upper front duct section positioned adjacent to a top of the at least one electronic component and extending toward a front of the broadcast camera, wherein the upper front duct section includes an inner top front duct section wall that defines a top front air inlet to the cooling duct;
a middle front duct section positioned adjacent to a side of the at least one electronic component, wherein the middle front duct section includes an inner middle front duct section wall that defines a middle front air inlet to the cooling duct; and
a lower front duct section positioned adjacent to a bottom of the at least one electronic component and extending toward the front of the camera, wherein the lower front duct section includes an inner bottom front duct section wall that defines a bottom front air inlet to the cooling duct;
a first cover plate positioned adjacent to the bottom front air inlet configured to seal a portion of the bottom front air inlet;
a first heat sink extending within the cooling duct in the upper front duct section and mounted in thermal communication with the at least one electronic component;
a second heat sink extending within the cooling duct in the middle front duct section and mounted in thermal communication with the at least one electronic component;

a third heat sink extending within the cooling duct in the lower front duct section and mounted in thermal communication with the at least one electronic component;
a fan mounted within the cooling duct at the front middle duct section and configured to draw air into the cooling duct through the top front air inlet, the middle front air inlet, and the bottom front air inlet;
a fourth heat sink extending within the cooling duct and mounted in thermal communication with the main processor board;
a fifth heat sink extending within the cooling duct and mounted in thermal communication with the transmission circuit board; and
a second cover plate mounted between the fifth heat sink and the transmission circuit board and configured to form at least a part of a side wall of the middle duct housing portion.

7. The broadcast camera according to claim 6, wherein the middle duct housing portion is positioned adjacent to the main processor board and the transmission circuit board, and separates the main processor board and the transmission circuit board from the cooling duct.

8. The broadcast camera according to claim 7, wherein the middle duct housing portion includes:
a front middle duct section positioned adjacent to the front duct housing portion;
an intermediate middle duct section adjacent to the main processor board and the transmission circuit board; and
a rear middle duct section positioned adjacent to the rear duct housing portion,
wherein the fourth heat sink extends within the cooling duct in the intermediate middle duct section, and
wherein the fifth heat sink extends within the cooling duct in the intermediate middle duct section.

9. The broadcast camera according to claim 6, wherein the rear duct housing portion is positioned adjacent to the power transformer and includes:
a first inner rear duct wall adjacent to the first camera housing portion that defines a side rear duct housing opening constructed to receive at least a part of the power transformer within the cooling duct; and
a second inner rear duct wall adjacent to the second camera housing portion that defines a rear side air outlet of the cooling duct; and
a rear perforated plate constructed to cover the rear side air outlet.

10. The broadcast camera according to claim 9, wherein the power transformer at least partially protrudes into the cooling duct from the side rear duct housing to dissipate heat generated by the power transformer into the cooling duct.

11. The broadcast camera according to claim 9, wherein the rear side air outlet comprises a total area that is at least as large as a sum of total areas of the top front air inlet, the middle front air inlet, and the bottom front air inlet.

12. The broadcast camera according to claim 6, wherein each of the first, second, third, fourth and fifth heats comprises a plurality of fins extending from a body of the respective heat sink and constructed for heat dissipation.

13. The broadcast camera according to claim 12, wherein the plurality of fins of each respective heat sink extend in a direction parallel to a direction of airflow of the air drawn into the cooling duct by the fan.

14. A broadcast camera, comprising:
a camera housing having a plurality of connectable camera housing portions to define a front section, a middle section, and a rear section of a body of the broadcast camera;
at least one electronic component disposed in the front section of the camera housing and that generates heat during operation of the camera;
a power transformer mounted in the rear section of the camera housing;
a duct housing mounted within the camera housing and having a front duct housing portion, a middle duct housing portion, and a rear duct housing portion that collectively form a cooling duct extending through the camera housing, wherein the front duct housing portion is positioned adjacent to the at least one electronic component and that separates the at least one electronic component from the cooling duct, with the front duct housing portion including:
an upper front duct section positioned adjacent to a top of the at least one electronic component and extending toward a front of the broadcast camera;
a middle front duct section positioned adjacent to a side of the at least one electronic component; and
a lower front duct section positioned adjacent to a bottom of the at least one electronic component and extending toward the front of the camera;
a plurality of heat sinks extending within the cooling duct in at least one of the upper front duct section, the middle front duct section, and the lower front duct section, with the plurality of heat sinks mounted in thermal communication with the at least one electronic component; and
a fan mounted within the cooling duct and configured to draw air into the cooling duct through one or more air inlets in the front duct housing portion.

15. The broadcast camera according to claim 14, further comprising:
a main processor board mounted in a first housing portion at the middle section of the camera housing;
a transmission circuit board mounted in a second housing portion at the middle section of the camera housing; and
at least one additional heat sink extending within the cooling duct and mounted in thermal communication with at least one of the main processor board and the transmission circuit board.

16. The broadcast camera according to claim 15, further comprising a cover plate mounted between the at least one additional heat sink and the transmission circuit board and configured to form at least a part of a side wall of the middle duct housing portion.

17. The broadcast camera according to claim 15,
wherein the middle duct housing portion is positioned adjacent to the main processor board and the transmission circuit board, and separates the main processor board and the transmission circuit board from the cooling duct, and
wherein the middle duct housing portion includes:
a front middle duct section positioned adjacent to the front duct housing portion;
an intermediate middle duct section adjacent to the main processor board and the transmission circuit board; and
a rear middle duct section positioned adjacent to the rear duct housing portion,
wherein the at least one additional heat sink extends within the cooling duct in the intermediate middle duct section.

18. The broadcast camera according to claim 15, wherein the rear duct housing portion is positioned adjacent to the power transformer and includes:

a first inner rear duct wall adjacent to the first camera housing portion that defines a side rear duct housing opening constructed to receive at least a part of the power transformer within the cooling duct; and a second inner rear duct wall adjacent to the second camera housing portion that defines a rear side air outlet of the cooling duct.

19. The broadcast camera according to claim 18, wherein the power transformer at least partially protrudes into the cooling duct from the side rear duct housing to dissipate heat generated by the power transformer into the cooling duct, and wherein the rear side air outlet comprises a total area that is at least as large as a sum of total areas of the top front air inlet, the middle front air inlet, and the bottom front air inlet.

20. The broadcast camera according to claim 14, wherein the one or more inlets comprise a top front air inlet, a middle front air inlet, and a bottom front air inlet, wherein the upper front duct section includes an inner top front duct section wall that defines the top front air inlet to the cooling duct, wherein the middle front duct section includes an inner middle front duct section wall that defines the middle front air inlet to the cooling duct, and wherein the lower front duct section includes an inner bottom front duct section wall that defines the bottom front air inlet to the cooling duct.

* * * * *